Oct. 14, 1930.                H. NYQUIST                1,778,085
DISTORTIONLESS AMPLIFYING SYSTEM
Filed Nov. 24, 1926
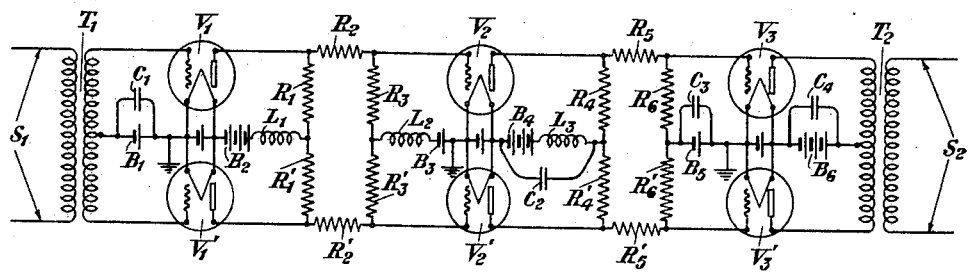
INVENTOR.
*H. Nyquist*
BY
ATTORNEY Patented Oct. 14, 1930

1,778,085

UNITED STATES PATENT OFFICE

HARRY NYQUIST, OF MILLBURN, NEW JERSEY, ASSIGNOR TO AMERICAN TELEPHONE AND TELEGRAPH COMPANY, A CORPORATION OF NEW YORK

DISTORTIONLESS AMPLIFYING SYSTEM

Application filed November 24, 1926. Serial No. 150,526.

This invention relates to signaling systems, and particularly to a push-pull amplifying system comprising a plurality of vacuum tubes in push-pull relationship, so arranged as to transmit signals from an incoming circuit to an outgoing circuit with negligible distortion.

In this invention there will be shown and described an amplifying system which comprises a plurality of pairs of vacuum tubes, the vacuum tubes of each pair being arranged in push-pull relationship, which pairs of vacuum tubes are coupled by a plurality of resistances so proportioned with respect to one or more sources of potential that the proper operating potentials will be provided for the electrodes of the vacuum tubes by virtue of the co-operation of these resistances with the one or more sources of potential. The one or more sources of potential of this invention are connected to circuits comprising suitable reactance components so that signaling currents will be by-passed around the sources of potential in order to eliminate, or, at least, to substantially minimize, cross-talk. This statement is made to aid in a better understanding of the invention.

It is an object of this invention to provide a plurality of pairs of three-element vacuum tubes, the vacuum tubes of each pair being in push-pull relationship, and so coupling one pair of vacuum tubes to another pair of vacuum tubes through suitable resistances as to permit the translation of signals with substantially negligible distortion.

It is another object of this invention to suitably proportion a plurality of resistances interconnecting one duplex vacuum tube translating circuit with another duplex vacuum tube translating circuit so that the drops in potential across these resistances will be of the proper magnitude to impress suitable operating potentials upon the electrodes of the vacuum tubes.

And a further object of this invention is to so relate a plurality of sources of potential to a plurality of vacuum tubes that the proper operating potentials will be applied to the electrodes of these vacuum tubes, and furthermore, to so connect combinations of capacitative and inductive reactances to said sources of potential that signals will be translated by these vacuum tubes without cross-talk through the sources of potential.

While this invention will be pointed out with particularity in the appended claim, the invention itself will be better understood from the detailed description hereinafter following, when read in connection with the accompanying drawing, showing a preferred embodiment of the invention merely for the purpose of illustration.

Referring to the drawing, there is shown a plurality of pairs of three-element vacuum tubes designated by the reference characters $V_1$ and $V'_1$, $V_2$ and $V'_2$, $V_3$ and $V'_3$. Each of these vacuum tubes comprises a filament, a grid and a plate, the filaments of each pair of vacuum tubes, such as $V_1$ and $V'_1$, being heated to electron-emitting temperatures preferably by a common battery. The vacuum tubes of each pair are preferably similar and equal in their structure and characteristics and may be replaced by a single duplex tube comprising a single filament, two grids and two plates. These pairs of three-element vacuum tubes are connected in tandem and accordingly transmit signals from an incoming circuit $S_1$ connected to the input circuits of the first pair of vacuum tubes $V_1$ and $V'_1$ through a transformer $T_1$, to an outgoing circuit $S_2$ connected to the output circuits of the last pair of vacuum tubes $V_3$ and $V'_3$ through a transformer $T_2$.

A plurality of resistances interconnect one pair of vacuum tubes with another pair of vacuum tubes. The resistances $R_1$, $R_2$ and $R_3$, and the resistances $R'_1$, $R'_2$ and $R'_3$ are inserted between the vacuum tubes $V_1$ and $V'_1$ and the vacuum tubes $V_2$ and $V'_2$, respectively. The resistances $R_4$, $R_5$ and $R_6$ and the resistances $R'_4$, $R'_5$ and $R'_6$ are inserted between the vacuum tubes $V_2$ and $V'_2$ and the vacuum tubes $V_3$ and $V'_3$, respectively. The resistances $R_2$ and $R'_2$ interconnect the plates of the vacuum tubes $V_1$ and $V'_1$ with the grids of the vacuum tubes $V_2$ and $V'_2$, whereas the resistances $R_5$ and $R'_5$ interconnect the plates of the vacuum tubes $V_2$ and $V'_2$ with the grids of the vacuum tubes $V_3$ and $V'_3$, respectively. All of these resistances obviously couple one pair of vacuum tubes with the next succeeding pair of vacuum tubes.

Signals in the incoming circuit $S_1$ are transmitted to the grids of the vacuum tubes $V_1$ and $V'_1$ through the transformer $T_1$. A battery $B_1$ renders the grids of these vacuum tubes suitably biased with respect to the filaments. A condenser $C_1$ bridges the battery $B_1$. If there is any unbalance between the input circuits of the vacuum tubes $V_1$ and $V'_1$ there will be a flow of signaling currents through that branch of the system common to the input circuits of the vacuum tubes $V_1$ and $V'_1$. Yet, by bridging the battery $B_1$ with the condenser $C_1$, as shown, a path will be provided which has substantially negligible reactance at the frequencies of the signaling currents. Accordingly there will be only a slight flow of signaling currents through the battery $B_1$ and, consequently, there will be a minimum of cross-talk due to the presence of the battery $B_1$ common to these input circuits. It will be understood, however, that while a capacitative reactance of suitable magnitude has been shown bridged across the battery $B_1$, an inductive reactance in series with the battery $B_1$ might in some cases be equally well employed to suppress, rather than to by-pass, signaling currents, and in still other cases a combination of shunt capacitative reactance and series inductive reactance might also equally well be employed, within the scope of this invention, it being remembered that wherever a shunt circuit is provided, a path should be established having no reactance, or substantially negligible reactance, at the frequencies within the band which is to be transmitted by the system.

A battery $B_2$ interconnects the plates and the filaments on the vacuum tubes $V_1$ and $V'_1$ through an inductance $L_1$ and the resistances $R_1$ and $R'_1$, respectively. The presence of the inductance $L_1$ in series with the battery $B_2$ prevents the transmission of signaling frequencies through that branch of the system common to the output circuits of the vacuum tubes $V_1$ and $V'_1$. Yet it will be understood that a capacitative reactance of a suitable magnitude, or a proper combination of a capacitative reactance and an inductive reactance might be employed instead of the inductance $L_1$, within the scope of this invention.

Current from the battery $B_2$ flows through the inductance $L_1$ and divides between resistances $R_1$ and $R'_1$. The currents which flow through resistances $R_1$ and $R'_1$ divide between the circuits of the plates and filaments of the vacuum tubes $V_1$ and $V'_1$, respectively, and between the resistances $R_2$ and $R'_2$, respectively. The currents which flow through resistances $R_2$ and $R'_2$ also flow through the resistances $R_3$ and $R'_3$, respectively, and then through the common path which includes the inductance $L_2$, battery $B_3$ and ground. The resistances $R_1$, $R_2$ and $R_3$ and the resistances $R'_1$, $R'_2$ and $R'_3$ are, preferably, respectively equal, or substantially equal to each other, and are so proportioned, or, if preferred, are so adjusted, that the drops in potential across these resistances due to the flow of current therethrough from battery $B_2$, together with the drops in potential across the terminals of batteries $B_2$ and $B_3$ will be of such magnitudes as to provide suitable operating potentials for the plates of the vacuum tubes $V_1$ and $V'_1$ and for the grids of the vacuum tubes $V_2$ and $V'_2$. It will be understood, however, that if either the amplifications or the internal impedances of the tubes $V_1$ and $V'_1$ are unequal, these inequalities may be compensated for by adjustments or by variations in the magnitudes of the resistances $R_1$, $R_2$ and $R_3$ and of the resistances $R'_1$, $R'_2$ and $R'_3$, respectively, so that the voltages due to the signaling currents which are impressed on the grids of the vacuum tubes $V_1$ and $V'_1$ with equal magnitudes, will be equally transmitted to the grids of the vacuum tubes $V_2$ and $V'_2$, respectively. The battery $B_3$, in series with the inductance $L_2$, further aids in bringing the grids of the vacuum tubes $V_2$ and $V'_2$ to suitable negative potentials with respect to the filaments of these vacuum tubes. Moreover, the inductance $L_2$ tends to prevent the flow of signaling frequencies in that branch of the system common to the input circuits of the vacuum tubes $V_2$ and $V'_2$, when these input circuits are slightly unbalanced.

A battery $B_4$ is connected to the plates of the vacuum tubes $V_2$ and $V'_2$ through an inductance $L_3$ and resistances $R_4$ and $R'_4$, respectively. A condenser $C_2$ is in shunt with the battery $B_4$ and the inductance $L_3$. The battery $B_4$ sends current through the inductance $L_3$, which divides between the resistances $R_4$ and $R'_4$. The currents which flow through resistances $R_4$ and $R'_4$ divide between the circuits of the plates and filaments of the vacuum tubes $V_2$ and $V'_2$ and between the resistances $R_5$ and $R'_5$, respectively. The currents which flow through the resistances $R_5$ and $R'_5$ also flow through the resistances $R_6$ and $R'_6$, respectively, and then through the common path which includes the battery $B_5$ and ground. The resistances $R_4$, $R_5$ and $R_6$ and the resistances $R'_4$, $R'_5$ and $R'_6$ are so proportioned, or if preferred, are so adjusted, that suitable operating potentials are impressed upon the plates of the vacuum tubes $V_2$ and $V'_2$ and upon the grids of the vacuum tubes $V_3$ and $V'_3$. Again, if either the amplifications or the internal impedances of the vacuum tubes $V_2$ and $V'_2$ are unequal, the effect of these inequalities may be overcome by adjustments or by variations in the magnitudes of the resistances $R_4$, $R_5$ and $R_6$, and of the resistances $R'_4$, $R'_5$ and $R'_6$, respectively, in order that the voltages due to the signaling currents impressed on the grids of the vacuum tubes $V_2$ and $V'_2$ with equal magnitudes, will be transmitted equally to the grids of the vacuum tubes $V_3$ and $V'_3$, respectively. The series inductance $L_3$ substantially suppresses signaling currents, though it freely transmits direct current from the battery $B_4$ to the plates of the vacuum tubes $V_2$ and $V'_2$, through resistances $R_4$ and $R'_4$. Yet, the shunt capacity $C_2$ about the battery $B_4$ and the series inductance $L_3$ permit any of the noise currents from the battery $B_4$ that pass the inductance $L_3$ to circulate in a local circuit which comprises the battery $B_4$, the inductance $L_3$ and the capacity $C_2$, thus eliminating these noise currents from the signaling circuits. It is apparent that the transmission of signaling frequencies through that branch of the system common to the output circuits of the vacuum tubes $V_2$ and $V'_2$ would also permit their impression upon the grids of the vacuum tubes $V_3$ and $V'_3$.

A condenser $C_3$, of suitable size, shunts the battery $B_5$ in the branch common to the input circuits of the vacuum tubes $V_3$ and $V'_3$. This condenser $C_3$ preferably provides a path of negligible reactance around the battery $B_5$ for the transmission of signaling frequencies, if there is any unbalance between the input circuits of the vacuum tubes $V_3$ and $V'_3$.

A battery $B_6$ applies the necessary operating potentials for the plates of the vacuum tubes $V_3$ and $V'_3$ through the upper and lower windings of the primary of the transformer $T_2$. A condenser $C_4$ of suitable magnitude bridges the battery $B_6$. It is well known that if there is any unbalance between the output circuits of the vacuum tubes $V_3$ and $V'_3$, signaling currents will flow through the branch of the system which is common to these output circuits. However, the condenser $C_4$ provides a path of negligible reactance for these signaling frequencies, and accordingly eliminates cross-talk through the battery $B_6$.

While it is obvious that in a perfectly balanced duplex translating system the filters, or suitable combinations of inductive and capacitative reactance, will not be necessary, yet it is equally obvious that no practical duplex translating system is perfectly balanced, and consequently, there is always found in the circuits common to both branches of the duplex system, signaling currents which induce cross-talk by virtue of the fact that these signaling currents flow through the battery or other source, or sources, of potential common to a number of circuits.

It will be understood that while generators or rectifiers may replace the batteries shown and described in this specification, these generators or rectifiers may, nevertheless, produce ripples or other high frequency currents which can be effectively eliminated by a suitable arrangement of inductive and capacitative reactances, as is shown herein.

It will also be understood that while a simple translating system involving sources of direct current may include filters or other suitable combinations of inductive and capacitative reactances to minimize noise and cross-talk, a duplex translating system which includes filters or other suitable combinations of inductive and capacitative reactances will eliminate noise and cross-talk with considerably less distortion of the transmitted signals.

It will also be understood that while this invention has been shown in one particular embodiment merely for the purpose of illustration, the general principles of this invention may be applied to other and widely varied organizations without departing from the spirit of the invention and the scope of the appended claim.

What is claimed is:

A distortionless coupling arrangement for an amplifying system comprising first and second pairs of vacuum tubes in push-pull relationship, four resistances connected in series relationship with each other in a complete circuit, two opposite resistances of which are of equal magnitude, said resistances of equal magnitude interconnecting the plate electrodes of the first pair of vacuum tubes with the grid electrodes of the second pair of vacuum tubes, respectively, the third of said resistances interconnecting the plate electrodes of the first pair of vacuum tubes, the fourth of said resistances interconnecting the grid electrodes of said second pair of vacuum tubes, a first source of potential interconnecting the midpoint of the third of said resistances with both filament electrodes of the first pair of vacuum tubes, and a second source of potential interconnecting the midpoint of the fourth of said resistances with both of the filament electrodes of the second pair of vacuum tubes.

In testimony whereof, I have signed my name to this specification this 23rd day of November, 1926.

HARRY NYQUIST.